United States Patent [19]
Breuer et al.

[11] 3,880,846
[45] Apr. 29, 1975

[54] VINYLAMINOACETYL CEPHALOSPORINS

[75] Inventors: Hermann Breuer; Uwe D. Treuner, both of Regensburg, Germany

[73] Assignee: E. R. Squibb & Sons, Inc., Princeton, N.J.

[22] Filed: Dec. 19, 1972

[21] Appl. No.: 316,623

[52] U.S. Cl.......... 260/243 C; 260/239.1; 424/246; 424/271
[51] Int. Cl...................... C07d 99/24; C07d 99/16
[58] Field of Search ................................. 260/243 C

[56] References Cited
UNITED STATES PATENTS

| | | | |
|---|---|---|---|
| 3,518,260 | 6/1970 | Spencer et al. | 260/243 C |
| 3,560,489 | 2/1971 | Morin | 260/243 C |
| 3,651,050 | 3/1972 | Nakanashi | 260/239.1 |
| 3,719,673 | 3/1973 | Bickel et al. | 260/239.1 |

Primary Examiner—Nicholas S. Rizzo
Attorney, Agent, or Firm—Lawrence S. Levinson; Merle J. Smith

[57] ABSTRACT

New vinylaminoacetylpenicillins and vinylaminoacetyl cephalosporins have the formula

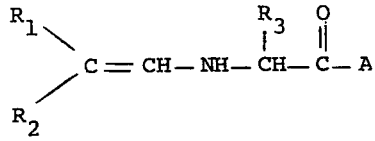

A is the 6-aminopenicillanic acid moiety and certain derivatives thereof or the 7-aminocephalosporanic acid moiety and certain derivatives thereof.
$R_1$ is —CN or —$COR_5$.
$R_2$ is —CN, —$COR_5$, —$SO_2R_6$ or —$PO(R_7)_2$.
$R_3$ is hydrogen, lower alkyl, phenyl, hydroxyphenyl, thienyl, furyl or pyridyl.
$R_5$, $R_6$ and $R_7$ each is lower alkoxy or phenyl.

These products are useful as antibacterial agents.

13 Claims, No Drawings

VINYLAMINOACETYL CEPHALOSPORINS

SUMMARY OF THE INVENTION

This invention relates to new vinylaminoacetyl-penicillins and cephalosporins having the formula (I)
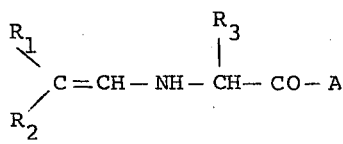

A represents 6-aminopenicillanic acid (6-APA) and certain derivatives thereof of the formula

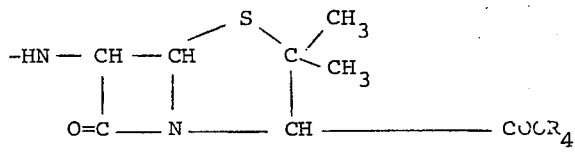

or 7-aminocephalosporanic acid (7-ACA) and certain derivatives thereof of the formula

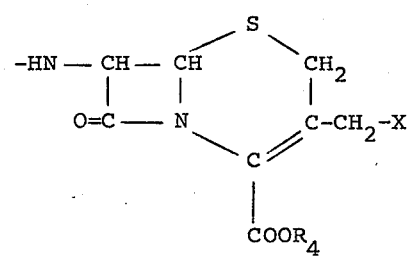

$R_1$ is —CN or —COR$_5$, $R_2$ is —CN, —COR$_5$, —SO$_2$R$_6$ or —PO(R$_7$)$_2$.

$R_3$ is hydrogen, lower alkyl, phenyl, hydroxyphenyl, thienyl, furyl or pyridyl.

$R_4$ is hydrogen, lower alkyl, phenyl-lower alkyl, an inorganic or organic salt forming ion or the group

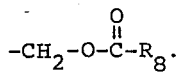

$R_5$, $R_6$ and $R_7$ each is lower alkoxy or phenyl.

$R_8$ is lower alkyl, phenyl or phenyl-lower alkyl.

X is hydrogen, lower alkanoyloxy, lower alkoxy, lower alkylmercapto or the radical of a nitrogen base.

The preferred members in each group are as follows: $R_1$ is cyano or —COR$_5$ wherein $R_5$ is lower alkoxy, especially ethoxy; $R_2$ is cyano, —COR$_5$ wherein $R_5$ is lower alkoxy, especially ethoxy, —SO$_2$R$_6$ wherein $R_6$ is phenyl, or —PO(R$_7$)$_2$ wherein $R_7$ is lower alkoxy, especially ethoxy; $R_3$ is hydrogen, phenyl (these two being most preferred, especially phenyl) or thienyl; $R_4$ is hydrogen, alkali metal (these two being most preferred, especially hydrogen, sodium and potassium), or lower alkanoyloxymethyl, especially pivaloyloxymethyl; $R_5$, $R_6$ and $R_7$ each is lower alkoxy, especially ethoxy, or phenyl, particularly in the context of $R_1$ and $R_2$ as described above; $R_8$ is lower alkyl, especially t-butyl; X is hydrogen or lower alkanoyloxy, especially acetoxy.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to seven carbons in the chain, for example, methyl, ethyl, propyl, isopropyl, butyl, isobutyl, t-butyl, amyl or the like. The groups with up to four carbons are preferred, especially methyl or ethyl.

The lower alkoxy groups include such lower alkyl groups linked to an oxygen. Similarly, the lower alkylmercapto groups include such lower alkyl groups linked to a sulfur.

The phenyl-lower alkyl groups similarly have a phenyl group attached to such lower alkyl groups, benzyl and phenethyl, especially the first, being preferred.

The lower alkanoyloxy groups are those including the acyl radical of the lower fatty acids of up to seven carbons in the acyl group. These include, for example, acetoxy, propionoxy, butyryloxy and the like.

The salt forming ions represented by $R_4$ are metal ions, e.g., aluminum, alkali metal ions such as sodium or potassium, alkaline earth metal ions such as calcium or magnesium, or an amine salt ion, of which a number are known for this purpose, for example, phenylalkylamines like dibenzylamine, N,N-dibenzylethylenediamine, lower alkylamines like methylamine, triethylamine, procaine, N-lower alkylpiperidines like N-ethylpiperidine, etc.

The radical of a nitrogen base represented by X is a lower alkylamine, e.g., methylamine, ethylamine, dimethylamine, triethylamine, a phenyl-lower alkylamine, e.g., dibenzylamine, 1-quinolinium, 1-picolinium or pyridinium.

The new compounds of this invention can be prepared by several methods. According to one procedure, a compound of formula II or formula III

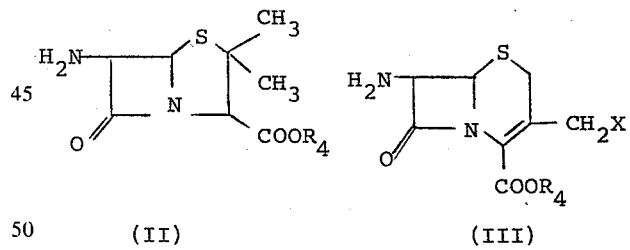

(II)                    (III)

is acylated with a reactive derivative of an acid of the formula (IV)
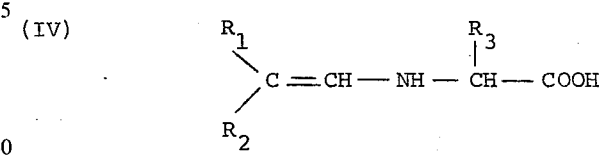

Reactive derivatives of the acid of formula IV include, for example, acid halides, acid anhydrides, mixed anhydrides of the acid of formula III with carboxylic acid monoesters, trimethylacetic acid or benzoic acid, acid azides, active esters like cyanomethyl ester, nitrophenyl ester or 2,4-dinitrophenyl ester, or active amides like acylimidazoles.

The reaction of the compounds of formulas II and III may also be effected in the presence of carbodiimides like dicyclohexylcarbodiimide, isoxazolium salts like N-ethyl-5-phenylisoxazolium-3'-sulfonate, or 2-ethoxy-1,2-dihydroquinoline-1-carboxylic acid ethyl ester.

Alternatively, a compound of formula V or formula VI

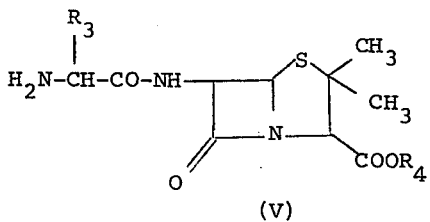

(V)

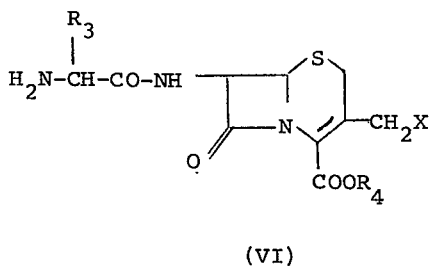

(VI)

is treated with an alkoxymethylene derivative of the formula (VII)

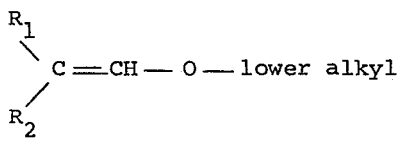

These alkoxymethylene derivatives are obtained by conventional reactions of a compound of the formula (VIII)

with a lower alkyl orthoformic acid of the formula (IX)

HC(O-lower alkyl)$_3$

The acids of formula IV are produced by known procedures, e.g., by the reaction of an alkoxymethylene derivative of formula VII with an amino acid of the formula (X)

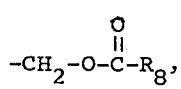

in the presence of an organic base like triethylamine.

When R is the acyloxymethyl group

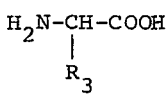

this group may be introduced onto the 6-aminopenicillanic acid moiety or the 7-aminocephalosporanic acid moiety at any stage either prior to or after the reaction with the compounds of formulas IV or VII, respectively. This is effected by treatment with one to two moles of a halomethyl ester of the formula (XI)

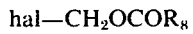

wherein hal is halogen, preferably chlorine or bromine, in an inert organic solvent such as dimethylformamide, acetone, dioxane, benzene or the like, at about ambient temperature or below.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes.* They may be used as antibacterial agents in a prophylactic manner, e.g., in cleaning or disinfecting compositions, or otherwise to combat infections due to organisms such as those named above, and in general may be utilized in a manner similar to penicillin G and other penicillins. For example, a compound of formula I or a physiologically acceptable salt thereof may be used in various animal species in an amount of about 1 to 200 mg/kg., daily, orally or parenterally, in single or two to four divided doses to treat infections of bacterial origin. For example, 5.0 mg./kg. may be used in mice.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleansing or disinfecting compositions, e.g., for disinfecting hospital or emergency rooms or equipment for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

6-[D-2-[(2,2-dicyanovinyl)amino]-2-phenylacetamido]penicillanic acid a. 1.74 g. (0.005 mol.) of anhydrous 6-(D-α-aminophenylacetamido)penicillanic acid are suspended in 50 ml. of methylene chloride and cooled to 0°–5°. 0.728 ml. (0.006 mol.) of triethylamine are added and the mixture is stirred until a clear solution is obtained. To this solution are added 0.732 g. (0.006 mol.) of ethoxymethylenemalonic acid dinitrile. After stirring for three hours, the solution is added with stirring to 300 ml. of ether and the resulting precipitate is filtered under suction. 2.1 g. of the triethylamine salt of 6-[D-2-[(2,2,-dicyanovinyl)amino]-2- phenylacetamido]penicillanic acid are obtained. To obtain the potassium salt, this product is dissolved in a little methanol, potassium ethylhexanoate is added and the salt is precipitated with ether, yield 1.7 g., m.p. 170° (dec.).

b. 15.1 g. (0.1 mol.) of phenylglycine are suspended in 50 ml. of dimethylformamide, 13.8 ml. of triethylamine are added and then 12.2 g. of ethoxymethylenemalonic acid dinitrile. The mixture is stirred for three days at room temperature. The dimethylformamide is then distilled off under vacuum, the residue is dissolved in 50 ml. of methanol, filtered and 50 ml. of a 2N solution of potassium ethylhexanoate in n-butanol are added. The resulting solution is added with stirring to one liter of ether. The potassium salt of D-2-[(2,2-dicyanovinyl)amino]-2-phenylacetic acid precipitates, yield 13.5 g., m.p. ca. 105° (dec.).

2.65 g. (0.01 mol.) of the potassium salt of D-2-[(2,2-dicyanovinyl)amino]-2-phenylacetic acid and 1.6 ml. of isobutyl chloroformate are suspended in 50 ml. of anhydrous tetrahydrofuran at −15° to form the mixed anhydride (solution A).

2.16 g. (0.01 mol.) of 6-aminopenicillanic acid are suspended in 50 ml. of a 50% solution of tetrahydrofuran and then brought into solution by the addition of 1.38 ml. of triethylamine at a temperature in the range of 0°–5° (solution B).

Solution B is added all at once with stirring to solution A. The mixture is stirred for one hour at −5° and then one hour at room temperature. The clear solution is concentrated in a rotary evaporator and the residue is taken up in water. The aqueous phase is extracted once with ether, then layered over with 100 ml. of fresh ether, cooled to 0°–5° and acidified with 2N hydrochloric acid to pH2. The layers are separated, the aqueous layer is extracted several times with ether, the combined ether extracts are dried with magnesium sulfate and then evaporated to dryness.

The residual 6-[D-2-[(2,2-dicyanovinyl)amino]-2-phenylacetamido]penicillanic acid is dissolved in methanol, potassium ethylhexanoate is added and the potassium salt is precipitated with ether. The product is identical with the product of part a.

EXAMPLE 2

6-[D-2-[(2,2-dicarbethoxyvinyl)amino]-2-phenylacetamido]-penicillanic acid

By substituting 0.006 mol. of ethoxymethylenemalonic acid diethyl ester for the ethoxymethylenemalonic acid dinitrile in part a of Example 1, 6-[D-2-[(2,2-dicarbethoxyvinyl)amino]-2-phenylacetamido]penicillanic acid is obtained. The potassium salt crystallizes with two molecules of water, m.p. 162° (dec.).

EXAMPLE 3

6-[2-[[2-carbethoxy-2-(phenylsulfonyl)vinyl]amino]-2-phenylacetamido]penicillanic acid 3.5 g. (10mM) of 6-(α-aminophenylacetamido)-penicillanic acid and 1.01 g. (10mM) of triethylamine in 50 ml. of dimethylformamide are stirred for 30 minutes, cooled to 0° and 2.8 g. (10mM) of 3-ethoxy-2-(phenylsulfonyl)acrylic acid ethyl ester is permitted to drop in with stirring overnight. The solution is filtered and the solvent is distilled off under vacuum (temp. max 50°). The honey-like viscous residue is taken up with water, extracted twice with ether, acidified to pH 2.5, extracted with ethyl acetate, dried, concentrated and then crystallized with petroleum ether, yield 4 g., m.p. 80°. The potassium salt is produced as in Example 1, m.p. 185° (dec.).

EXAMPLE 4

6-[2-[[2-cyano-2-(phenylsulfonyl)vinyl]amino]-2-phenylacetamido] penicillanic acid By following the procedure of Example 3 utilizing 1.75 g. (5mM) of 6-(α-aminophenylacetamido)penicillanic acid and 0.5 g. (5mM) of triethylamine in 50 ml. of dimethylformamide, and substituting 1.15 g. of 3-ethoxy-2-(phenylsulfonyl)acrylonitrile for the 3-ethoxy-2-(phenylsulfonyl)acrylic acid ethyl ester, 2 g. of 6-[2-[[2-cyano-2-(phenylsulfonyl)vinyl]amino]-2-phenylacetamido]penicillanic acid are obtained, 80°–81° (dec.). The potassium salt is obtained by the procedure of Example 1, m.p. 170° (dec.).

EXAMPLE 5

-[2-[(2-cyano-2-phosphonovinyl)amino]-2-phenylacetamido]penicillanic acid, P,P-diethyl ester 80 g. (500mM) of 2-(diethylphosphonyl)acetonitrile, 150 g. (1M) of orthoformate acid triethyl ester, 10 ml. of acetic anhydride and 2 g. of zinc chloride are refluxed for one hour, then distilled. 99.8 g. of 3-ethoxy-2-(diethylphosphonyl)acrylonitrile are obtained as a colorless oil as the fraction with the b.p.$_{0.05}$ 145°–174°.

By following the procedure of Example 3 utilizing 3.5 g. (10mM) of 6-(α-aminophenylacetamido)penicillanic acid and 1.01 g. (10mM) of triethylamine in 50 ml. of dimethylformamide, and substituting 2.6 g. (10mM) of 3-ethoxy-2-(diethylphosphonyl)acrylonitrile instead of 3-ethoxy-2-(phenylsulfonyl)acrylic acid ethyl ester, 2.2 g. of 6-[2-[(2-cyano-2-phosphonovinyl)amino]-2-phenylacetamido]penicillanic acid, P,P-diethyl ester, are obtained, m.p. 53°.

EXAMPLE 6

6-[2-[2-carbethoxy-2-(phosphonovinyl)amino]-2-phenylacetamido]penicillanic acid, P,P-diethyl ester 140 g. (900 mM) of ethyl iodide is added dropwise over a period of three hours to the paste obtained from the combination of 165g. (600mM) of 3-hydroxy-2-phosphonoacrylic acid, triethyl ester, sodium salt, 82 g. (600mM) of potassium bicarbonate and 1 liter of acetone. The reaction mixture is stirred for 24 hours at room temperature. The undissolved material is filtered under suction, the solvent is distilled off and the residue is fractionated. 131 g. of 3-ethoxy-2-phosphonacrylic acid, triethyl ester, is collected as the fraction b.p.$_{0.01}$ 170°–175° as a yellowish oil.

By following the procedure of Example 3, and substituting the 3-ethoxy-2-phosphonoacrylic acid, triethyl ester, for the 3-ethoxy-2-(phenylsulfonyl)acrylic acid ethyl ester, 6-[2-[2-carbethoxy-2-(phosphonovinyl)amino]-2-phenylacetamido]penicillanic acid, P,P-diethyl ester is obtained.

The following additional products are obtained by the procedure of either Example 1 or Example 3, by substituting starting material having the same substituents $R_1$, $R_2$, $R_3$ and $R_4$ indicated in the table:

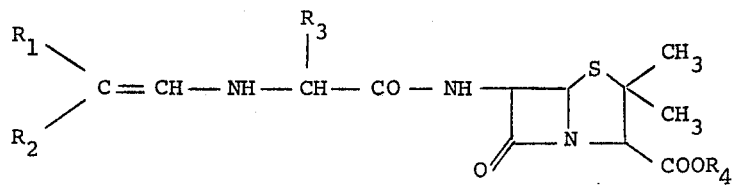

| Example | $R_1$ | $R_2$ | $R_3$ | $R_4$ |
|---|---|---|---|---|
| 7 | $-COOCH_3$ | $-COOCH_3$ | H | $-CH_3$ |
| 8 | $-CN$ | $-COOC_2H_5$ | $-C_2H_5$ | H, Na |
| 9 | $-COOC_2H_5$ | $-SO_2C_6H_5$ | thienyl | $-CH_2C_6H_5$ |
| 10 | $-COOC_3H_7$ | $-COOC_3H_7$ | $-C_6H_4OH$ | $-CH_2OOCCH(CH_3)_2$ |
| 11 | $-CN$ | $-COOC_2H_5$ | H | $-CH_2OOCC_6H_5$ |
| 12 | $-CN$ | $-PO(C_6H_5)_2$ | $-C_6H_5$ | K |
| 13 | $-COOC_2H_5$ | $-SO_2C_6H_5$ | furyl | H |
| 14 | $-COOC_2H_5$ | $-COOC_2H_5$ | pyridyl | K |
| 15 | $-COOC_2H_5$ | $-COOC_2H_5$ | thienyl | $C_2H_5$ |
| 16 | $-CN$ | $-PO(C_6H_5)_2$ | pyridyl | H |
| 17 | $-CN$ | $-COC_6H_5$ | $-C_6H_5$ | $-CH_2OOCCHC_6H_5$ |
| 18 | $-CN$ | $-COOC_2H_5$ | H | $-N(C_2H_5)_3$ |
| 19 | $-CN$ | $-SO_2OC_2H_5$ | $CH_3$ | H |

EXAMPLE 20

7-[2-[(2,2-dicarbethoxyvinyl)amino]acetamido]cephalosporanic acid 15.3 g. (0.07 mol.) of ethoxymethylenemalonic acid diethyl ester, 13.1 ml. of triethylamine and 3.73 g. (0.05 mol.) of glycine in 50 ml. of dimethylformamide are stirred for 24 hours at room temperature. The clear solution is concentrated in a rotary evaporator at 60°. The syrup-like residue is dissolved in saturated sodium bicarbonate solution, the solution extracted with ether and the aqueous phase is acidified with dilute hydrochloric acid. 11.7 g. of 2-[2-(dicarbethoxy)vinyl]acetic acid are obtained, m.p. 150°–151°.

4.9 g. (0.02 mol.) of 2-[2-(dicarbethoxy)vinyl]acetic acid, 2.76 ml. of triethylamine and 2.6 ml. of isobutyl chloroformate are admixed at −15° to obtain the mixed anhydride (solution A).

5.44 g. (0.02 mol.) of 7-aminocephalosporanic acid are suspended in 72 ml. of 50% tetrahydrofuran and brought into solution by the addition of 2.76 ml. of triethylamine at a temperature in the range of 0° to 5 (solution B).

Solution B is added to solution A all at one time and the mixture is stirred for one hour at −5°, then one hour at room temperature. The clear solutionn is concentrated in a rotary evaporator and the residue is taken up with water. This is extracted once with ethyl acetate, the aqueous phase is cooled to 0° to 5°, layered over with ethyl acetate and the aqueous phase is acidified to pH2 with hydrochloric acid. The layers are separated and the aqueous phase is once more extracted with ethyl acetate. The ethyl acetate extracts are combined, dried with magnesium sulfate and concentrated. The solid residue is triturated with petroleum ether and filtered under suction. The yield amounts to 6.3 g. of crude 7-[2-[(2,2-dicarbethoxyvinyl)amino]acetamido]cephalosporanic acid.

The crude product is dissolved in methanol, filtered off from a small amount of insoluble material and treated with a 2N solution of potassium ethylhexanoate in n-butanol. 4.2 g. of the potassium salt crystallize, m.p. 135°–137° (dec.).

By substituting 7-amino-3-desacetoxycephalosporanic acid (7-ADCA) for the 7-aminocephalosporanic acid (7-ACA) in the above procedure, 7-[2-[(2,2-dicarbethoxyvinyl)amino]acetamido]-3-desacetoxycephalosporanic acid and its potassium salt are obtained.

EXAMPLE 21

7-[2-[(2,2-dicyanovinyl)amino]acetamido]cephalosporanic acid 2.21 g. of the trifluoroacetic acid salt of 7-(2-aminoacetamido)cephalosporanic acid are dissolved in 50 ml. of methylene chloride and 1.46 ml. (0.012 mol.) of triethylamine are added. 0.73 g. (0.006 mol.) of ethoxymethylenemalonic acid dinitrile are added and the mixture is stirred for three hours at 0°–5°. Upon the addition of ether to the clear solution the triethylamine salt of 7-[2-[(2,2-dicyanovinyl)amino]acetamido]cephalosporanic acid precipitates, yield 2.3 g.

This salt is dissolved in 30 ml. of water and brought to pH3.5 with 2N hydrochloric acid, with cooling. The turbidity which forms is filtered off and the filtrate is slowly concentrated to about 15 ml. under vacuum. The 7-[2-[(2,2-dicyanovinyl)amino]acetamido]cephalosporanic acid crystallizes. After cooling for several hours at 5°, the product is filtered under suction, yield 0.9 g., m.p. 134°–136° (dec.).

EXAMPLE 22

7-[2-[[(2-cyano-2-carbethoxy)vinyl]amino]acetamido]cephalosporanic acid 7.46 g. (0.1 mol.) of glycine, 17 g. of ethoxymethylenecyanoacetic acid ethyl ester, 13.6 ml. of triethylamine and 50 ml. of dimethylformamide are admixed and stirred overnight at room temperature. The mixture is concentrated in a rotary evaporator, the residue is taken up in 100 ml. of methanol and 50 ml. of a 2N solution of potassium ethylhexanoate in n-butanol are added. 100 ml. of ether are added and the precipitated crystals are filtered under suction. 21.3 g. of 2-[2-(2-cyano-2-carbethoxyvinyl)amino]acetic acid, potassium salt, are obtained.

5 drops of pyridine are added to a suspension of 4.72 g. (0.02 mol.) of 2-[[2-(2-cyano-2-carbethoxy)vinyl]amino]acetic acid, potassium salt, in 25 ml. of benzene. Then a solution of 5.04 ml. of oxalyl chloride in 10 ml. of benzene is added dropwise with stirring at 15°. There is a strong evolution of gas. After completing the addition, the reaction mixture is stirred for 30 minutes, then evaporated to dryness under vacuum. The residue is added to 100 ml. of fresh benzene, treated with activated charcoal and filtered. After concentration, 2.6 g. of 2-[(2-cyano-2--carbethoxyvinyl)amino]acetyl chloride remain, which are used without further purification in the next step.

2.45 g. (0.009 mol.) of 7-aminocephalosporanic acid and 3.26 ml. of triethylamine are dissolved in 30 ml. of anhydrous chloroform. To this solution is added dropwise at −10° over a period of 30 minutes a solution of 2.16 g. (0.01 mol.) of [(2-cyano-2-carbethoxyvinyl)amino]acetyl chloride in 15 ml. of chloroform. This is permitted to react for 10 minutes more and then 2N hydrochloric acid is added to bring the pH to 1.5, whereupon a viscous mass separates. The water is removed and the chloroform layer with the viscous mass is treated with sodium bicarbonate solution. The sodium bicarbonate extract is shaken twice with ether, the aqueous phase is layered over with ethyl acetate, cooled to 0°–5° and the pH is adjusted to 1.5 with 2N hydrochloric acid. The aqueous phase is extracted again with ethyl acetate. The combined ethyl acetate extracts are treated with carbon, dried with magnesium sulfate, filtered and concentrated. 2.3 g. of 7-[2-[[(2-cyano-2-carbethoxy)vinyl]amino]acetamido]cephalosporanic acid are obtained.

The potassium salt is obtained by dissolving the foregoing product in methanol, adding an equivalent amount of potassium ethylhexanoate and precipitating with ether, yield 1.8 g., m.p. 138° (dec.).

By substituting 7-ADCA for the 7-ACA in the above procedure 7-[2-[[(2-cyano-2-carbethoxy)vinyl]amino]acetamido]-3-desacetoxycephalosporanic acid and its potassium salt are obtained.

EXAMPLE 23

7-[2-[(2-cyano-2-(phenylsulfonyl)vinyl-]amino]acetamido cephalosporanic acid 2.21 g. (0.005 mol.) of the trifluoracetic acid salt of 7-(2-aminoacetamido)cephalosporanic acid are suspended in 50 ml. of methylene chloride and brought into solution with the addition of 1.46 (0.012 mol.) of triethylamine. The solution is cooled to 0°–50°, 1.42 g. (0.006 mol) of 3-ethoxy-2-(phenylsulfonyl)acrylonitrile are added to the mixture and it is stirred for four hours. The addition of ether to the clear solution precipitates the triethylamine salt of 7-[2-[(2-cyano-2-(phenylsulfonyl)vinyl]amino]acetamidocephalosporanic acid, yield 2.4 g. The free acid is obtained by dissolving the triethylamine salt in water, adjusting to pH7, extracting once with ethyl acetate, layering over with ethyl acetate, acidifying and obtaining the product from the ethyl acetate layer, yield 1.4 g.

The potassium salt is obtained by dissolving the acid in 30 ml. of methanol, filtering, treating with 2 ml. of a 2N solution of potassium ethylhexanoate in n-butanol and precipitating the salt by the addition of ether, yield 1.3 g., m.p. 155° (dec.).

By substituting 7-(2-aminoacetamido)-3-desacetoxycephalosporanic acid for the 7-(2-aminoacetamido)cephalosporanic acid in the above procedure, 7-[2-[(2-cyano-2-(phenylsulfonyl)vinyl]acetamido]-3-desacetoxycephalosporanic acid and its salts are obtained.

EXAMPLE 24

7-[D-2-[(2,2-dicyanovinyl)amino]-2-phenylacetamido]-3-desacetoxycephalosporanic acid 1.73 g. (0.05 mol.) of anhydrous 7-(D-α-aminophenylacetamido)-3-desacetoxycephalosporanic acid are suspended in 50 ml. of methylene chloride and 0.728 ml. (0.006 mol.) of triethylamine are added. After 15 minutes, the solution is quite clear. 0.732 g. (0.006 mol.) of ethoxymethylene malonic acid dinitrile are added. The solution becomes clear. After an hour, crystals begin to precipitate. After three hours, the product, 7-[D-2-[(2,2-dicyanovinyl)amino]-2-phenylacetamido]-3-desacetoxycephalosporanic acid triethylamine salt, is filtered under suction, yield 2.9 g., m.p. 128°–130°.

EXAMPLE 25

7-[D-2-[(2,2-dicyanovinyl)amino]-2-phenylacetamido]cephalosporanic acid 2.03 g. (0.05 mol.) of anhydrous 7-(D-α-aminophenylacetamido)cephalosporanic acid and 1.46 ml. (0.012 mol.) of triethylamine are dissolved in 50 ml. of methylene chloride. 0.732 (0.006 mol.) of ethoxymethylene malonic acid dinitrile are added and stirred for three hours at 0°–5°. Upon the addition of ether, the triethylamine salt of 7-[D-2-[(2,2-dicyanovinyl)amino]-2-phenylacetamido cephalosporanic acid precipitates, yield 2.8 g. This salt is dissolved in water and, while cooling, acidified with hydrochloric acid to pH2. 7-[D-2-[(2,2-dicyanovinyl)amino]-2-phenylacetamido]cephalosporanic acid precipitates, yield 1.4 g. This product is converted to the potassium salt by the procedure of Example 23, yield 1.2 g., m.p. 163°–165°.

The following additional products are obtained by the procedure of either Example 20 or Example 21, by substituting starting material having the same substituents $R_1$, $R_2$, $R_3$, $R_4$ and X indicated in the table:

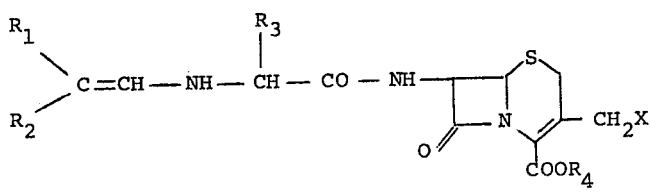

| Example | $R_1$ | $R_2$ | $R_3$ | $R_4$ | X |
|---|---|---|---|---|---|
| 26 | $-COOC_2H_5$ | $-SO_2(C_6H_5)$ | $C_6H_5$ | H | H |
| 27 | $-COOCH_3$ | $-COOCH_3$ | H | $CH_3$ | $-SCH_3$ |
| 28 | $-CN$ | $-COOC_2H_5$ | $-C_2H_5$ | H, Na | $-OCOCH_3$ |
| 29 | $-COOC_2H_5$ | $-SO_2C_6H_5$ | ![thiophene] | H | $-OCOC_2H_5$ |
| 30 | $-COOC_3H_7$ | $-COOC_3H_7$ | $-C_6H_4OH$ | $-CH_2OCCH(CH_3)_2$ (O) | H |
| 31 | $-CN$ | $-COOC_2H_5$ | H | $-CH_2OCC_6H_5$ (O) | $-OCH_3$ |
| 32 | $-CN$ | $-PO(C_6H_5)_2$ | $-C_6H_5$ | K | $-OCOCH_3$ |
| 33 | $-COOC_2H_5$ | $-SO_2C_6H_5$ | ![furan] | H | $-SCH_3$ |
| 34 | $-COOC_2H_5$ | $-COOC_2H_5$ | ![pyridine] | K | $-OC_2H_5$ |
| 35 | $-COOC_2H_5$ | $-COOC_2H_5$ | ![thiophene] | $C_2H_5$ | $-OCOCH_3$ |
| 36 | $-CN$ | $-PO(C_6H_5)_2$ | ![pyridine] | H | ![N-heterocycle] |
| 37 | $-CN$ | $-COC_6H_5$ | $-C_6H_5$ | $-CH_2OCCHC_6H_5$ (O) | H |
| 38 | $-CN$ | $-COOC_2H_5$ | H | $-N(C_2H_5)_3$ | H |

—Continued

| Example | $R_1$ | $R_2$ | $R_3$ | $R_4$ | X |
|---------|-------|-------|-------|-------|---|
| 39 | —CN | —SO$_2$OC$_2$H$_5$ | CH$_3$ |  | H |
| 40 | —CN | —PO(C$_6$H$_5$)$_2$ | H | H | OCOCH$_3$ |
| 41 | —COOC$_2$H$_5$ | —PO(OC$_2$H$_5$)$_2$ | C$_6$H$_5$ | H | H |
| 42 | —CN | —COOC$_6$H$_5$ | 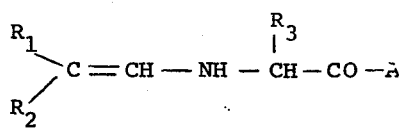 | H | OCH$_3$ |
| 43 | —CN | —CN | H | —CH$_2$C$_6$H$_5$ | H |

What is claimed is:

1. A compound of the formula

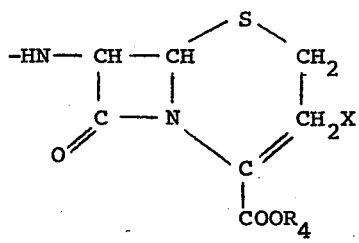

wherein A is

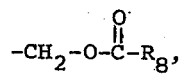

$R_1$ is —CN or —COR$_5$;
$R_2$ is —CN, —COR$_5$, —SO$_2$R$_6$ or —PO(R$_7$)$_2$;
$R_3$ is hydrogen, lower alkyl, phenyl, hydroxyphenyl, thienyl, furyl or pyridyl;
$R_4$ is hydrogen, lower alkyl, phenyl-lower alkyl, $$-CH_2-O-\overset{O}{\underset{\|}{C}}-R_8,$$

aluminum, alkali metal, alkaline earth metal, phenyl-lower alkylamine, lower alkylamine, N-lower alkylpiperidine;
$R_5$, $R_6$ and $R_7$ each is lower alkoxy or phenyl;
$R_8$ is lower alkyl, phenyl or phenyl-lower alkyl
and X is hydrogen, lower alkanoyloxy, lower alkoxy, lower alkylmercapto, lower alkylamino, phenyl-lower alkylamine, quinolinium or picolinium.

2. A compound as in claim 1 wherein $R_1$ and $R_2$ each is cyano or —COR$_5$, $R_3$ is phenyl; $R_4$ is hydrogen, alkali metal or lower alkanoyloxymethyl; and X is hydrogen or lower alkanoyloxy.

3. A compound as in claim 1 wherein $R_1$ and $R_2$ each is cyano.

4. A compound as in claim 1 wherein $R_1$ and $R_2$ each is carbethoxy.

5. A compound as in claim 1 wherein $R_1$ and $R_2$ each is carbethoxy, $R_3$ is hydrogen, $R_4$ is potassium and X is acetoxy.

6. A compound as in claim 1 wherein $R_1$ and $R_2$ each is cyano, $R_3$ and $R_4$ each is hydrogen and X is acetoxy.

7. A compound as in claim 1 wherein $R_1$ is cyano, $R_2$ is carbethoxy, $R_3$ and $R_4$ each is hydrogen and X is acetoxy.

8. A compound as in claim 1 wherein $R_1$ is cyano, $R_2$ is phenylsulfonyl, $R_3$ and $R_4$ each is hydrogen and X is acetoxy.

9. A compound as in claim 1 wherein $R_1$ and $R_2$ each is cyano, $R_3$ is phenyl and $R_4$ and X each is hydrogen.

10. A compound as in claim 1 wherein $R_1$ and $R_2$ each is cyano, $R_3$ is phenyl, $R_4$ is potassium and X is acetoxy.

11. A compound of the formula

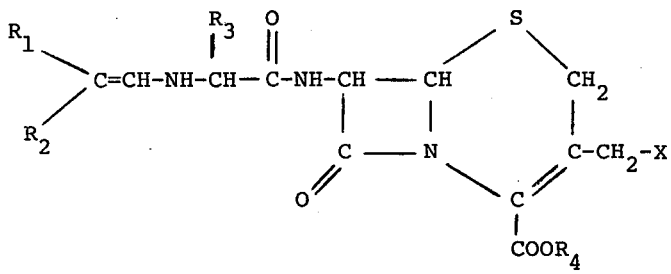

wherein
$R_1$ is —CN or —COR$_5$;
$R_2$ is —CN, —COR$_5$, —SO$_2$R$_6$ or —PO(R$_7$)$_2$;
$R_3$ is hydrogen, lower alkyl or phenyl;

$R_4$ is hydrogen, lower alkyl, phenyl-lower alkyl,

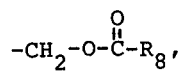

aluminum, alkali metal, alkaline earth metal, phenyl-lower alkylamine, lower alkylamine, or N-lower alkylpiperidino;

$R_5$, $R_6$ and $R_7$ each is lower alkoxy or phenyl;

$R_8$ is lower alkyl, phenyl or phenyl-lower alkyl; and X is hydrogen, lower alkanoyloxy and picolinium.

12. A compound as in claim 1 wherein $R_1$ is cyano or $-COR_5$; $R_2$ is cyano, $-COR_5$, $-SO_2R_6$ or $-PO(R_7)_2$; $R_3$ is hydrogen, phenyl or thienyl; $R_4$ is hydrogen, alkali metal or lower alkanoyloxymethyl; $R_5$ and $R_7$ each is lower alkoxy; $R_6$ is phenyl; and X is hydrogen or lower alkanoyloxy.

13. A compound as in claim 1 wherein $R_1$ is cyano.

* * * * *